3,639,524
Patented Feb. 1, 1972

3,639,524
HYDROPHILIC GEL POLYMER INSOLUBLE IN WATER FROM POLYVINYLPYRROLIDONE WITH N-VINYL-2-PYRROLIDONE AND METHACRYLIC MODIFIER
Maurice Seiderman, 3306 Deronda Drive, Los Angeles, Calif. 90028
No Drawing. Filed July 28, 1969, Ser. No. 845,499
Int. Cl. C08f 15/40
U.S. Cl. 260—885     8 Claims

ABSTRACT OF THE DISCLOSURE

A plastic or resin product obtained by mixing comminuted polyvinylpyrrolidone, vinylpyrrolidone, a modifier such as an organic methacrylate, optionally a crosslinking agent, and optionally a catalyst; and causing polymerization to take place by elevating the temperature. The inventive product is insoluble in water but is hydratable with water, and may take up as much as 90% by weight of water. The hydrated product is optically transparent and especially suitable for contact lenses.

---

This invention relates to transparent, optically clear polymers suitable for manufacturing contact lenses, and particularly to such polymers that have been prepared with modifiers and crosslinking agents, and the method of preparation of the modified, crosslinked, optically clear polymers.

Polyvinylpyrrolidone is prepared by Reppes process. 1,4-butanediol obtained in the Reppe butadiene synthesis is dehydrogenated over copper at 200° C. to form 2-butyrolactone which, when reacted with ammonia, gives pyrrolidone. Reacting pyrrolidone with acetylene gives the vinyl pyrrolidone monomer. The monomer is polymerized by heating it in the presence of hydrogen peroxide and ammonia, as represented by the following equation:

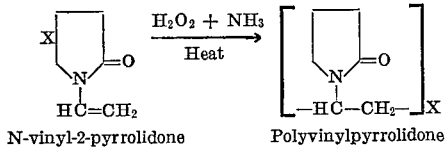

N-vinyl-2-pyrrolidone     Polyvinylpyrrolidone

Polyvinylpyrrolidone is a faintly yellow solid resembling albumin and having a medium molecular weight of about 25,000. It is soluble in water giving a colloidal solution. It has been employed to increase blood volume in shock cases and as an additive to blood plasma.

It is an object of this invention to provide polyvinylpyrrolidone polymers or resins which, unlike polyvinylpyrrolidone, are substantially insoluble in water and aqueous solutions or fluids of the type found in the human eye.

Another object of the invention is to provide a method for preparing substantially water insoluble, optically clear, modified polyvinylpyrrolidone polymers or resins.

Additional objects of the invention will become apparent from the following description, which is given primarily for purposes of illustration, and not limitation.

Stated in general terms, the objects of the invention are attained by reacting a mixture of polyvinylpyrrolidone, vinylpyrrolidone, a modifier such as an organic methacrylate, preferably a hydroxyalkyl methacrylate; and preferably a crosslinking agent such as an olefin, preferably an olefin hydroxyalkyl methacrylate; and preferably a catalyst such as an organic peroxide. The reaction product preferably is treated or extracted with water to hydrate the product or to extract unreacted or water-soluble materials respectively.

The polyvinylpyrrolidone should be comminuted, for example powdered to pass an eighty-mesh screen.

The resulting modified and crosslinked polyvinylpyrrolidone resins, or polymers, are insoluble in water or aqueous body fluids. They are clear, transparent or translucent and flexible or rubbery depending upon the amounts and type of modifiers and crosslinking agents used. The physical properties of the resins or polymers of the invention are controlled by controlling the ratios of the modifier and the crosslinking agent to the amount of vinylpyrrolidone used in the reaction mixture. Completely crosslinked polymers or resins can be made in accordance with the invention, which are hard and infusible and can be machined and polished to an optical finish for such purposes as contact lenses, for example. Incompletely crosslinked polymers or resins of the invention are fusible, and can be pressed into molds. Complete crosslinking can be accomplished by heating the molds under pressure.

The reaction mixture can contain from about 5% to about 75% of polyvinylpyrrolidone, the balance of the ingredients depending upon the physical properties desired in the polymers or resins produced. The ratio of vinylpyrrolidone to polyvinylpyrrolidone should be in the range from about 0.1 to about 70 parts per 100 parts of polyvinylpyrrolidone.

The ratio of liquid monomeric modifiers can vary from about 135 parts to about 2000 parts per 100 parts of polyvinylpyrrolidone, and especially from about 350 parts per hundred to about 1000 parts, calculated by measuring liquid monomeric modifiers in milliliters and by weighing the polyvinylpyrrolidone powder in grams.

Similarly, the ratio of the amount of crosslinking agent to the dry weight of polyvinylpyrrolidone used can vary from about 0 parts per hundred to about 25 parts per hundred, preferably from about 1 part per hundred to about 7 parts per hundred, and especially from about 2 parts per hundred to about 5 parts per hundred, calculated using dry weight of polyvinylpyrrolidone measured in grams and measuring the liquid crosslinking agents in milliliters.

Among the hydroxyalkyl methacrylate modifiers that can be used in preparing the polyvinylpyrrolidone polymers, or resins, of the invention are: 2-hydroxyethyl methacrylate and 2-hydroxypropyl methacrylate. Alkylamino alkylmethacrylate such as 2-dimethylaminoethyl methacrylate and 2-butylaminoethyl methacrylate can be used as modifiers. Other examples of methacrylates that can be used as modifiers are methacrylamide, cyclohexyl methacrylate, and tetrahydrofurfuryl methacrylate. Olefin glycol methacrylates such as ethylene glycol monomethacrylate, triethylene glycol monomethacrylate, tetraethylene glycol monomethacrylate and propylene glycol monomethacrylate. Other examples of modifiers are dimethylamino ethyl methacrylate, piperidinoethyl methacrylate, morpholinoethyl methacrylate, etc.

Among the crosslinking agents that can be used in accordance with the invention are olefin glycol dimethacrylates such as ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate and diethylene glycol monomethacrylate. Other examples of crosslinking agents are methacrylic acid, methacrylyl glycolic acid, etc.

Among the catalysts that can be used in preparing the polymers or resins of the invention are organic peroxides such as benzoyl peroxide, lauryl peroxide, cumene hydroperoxide, dibutyl peroxide, etc. Other suitable catalysts are azobisisobutyronitrile, tertiary butyl peroxide, tertiary butyl peroxide, tertiary butyl hydroperoxide, ammonia plus hydrogen peroxide, and others. Catalysts that are harmless or non-injurious if left remaining in the products or resins, are preferred although the removal of these residues is done by extraction by hydration in large volumes of water or a continuous flow of water. The amount of catalysts employed generally ranges from zero to 1 gram per 100 milliliters of the reaction mixture. Certain compositions of the mixture require very little catalyst; others require a great deal more; and some give satisfactory resins with none.

The reaction mixture is then raised to a temperature of from about 50° C. to about 120° C. or even higher, but preferably about 60° C. to 70° C., and maintained within that temperature range until polymerization is completed, which is general requires from about ½ to about 24 hours depending upon the temperature, amount of catalyst, if any, and relative proportions of components.

The following examples illustrate the invention:

EXAMPLE 1

A reaction mixture is prepared by mixing 100 grams polyvinylpyrrolidone, 75 milliliters vinylpyrrolidone, 50 milliliters hydroxyethyl methacrylate, 5 grams ethylene glycol dimethacrylate and 0.5 gram benzoyl peroxide. The resulting mixture was poured into ⅝ inch diameter glass tubes coated with a fluorocarbon to prevent sticking of the product to the tube or breakage due to shrinkage or expansion during the polymerization reaction. The tubes were capped and placed in a hot circulating oven kept at about 65° C. for about 2 hours. The oven was shut off and the polymerization product was permitted to cool to room temperature. The tubes then were broken away and the rods of polyvinylpyrrolidone resin product were obtained. A portion of each rod was cut off and machined to a specified thickness. The cut off portion was placed in water and permitted to swell by water absorption or hydration. The amount of swelling was measured. The resultant polymer absorbed 87.2% water.

EXAMPLE 2

A reaction mixture was prepared by mixing 50 grams polyvinylpyrrolidone, 5 milliliters vinylpyrrolidone, 50 milliliters hydroxyethyl methacrylate, 5 milliliters ethylene glycol dimethacrylate and 0.1 gram benzoyl peroxide. The resulting reaction mixture was reacted in the same manner as described in Example 1. The cut off portions of the products rods absorbed only half as much water and swelled only half as much as the product rods produced by Example 1.

EXAMPLE 3

Hydroxypropyl methacrylate was substituted for hydroxyethyl methacrylate in Example 1 and the reaction conditions of Example 1 were repeated. The product thus produced was more clear and more transparent than the product obtained in Example 1.

EXAMPLE 4

Hydroxypropyl methacrylate was substituted for hydroxyethyl methacrylate in Example 2. Otherwise, the polymers were prepared as in the case of Example 2. Again the product polymer or resin rods were more transparent than those resulting in Example 2.

EXAMPLE 5

50 milliliters hydroxypropyl methacrylate was mixed with 50 milliliters of hydroxyethyl methacrylate. 25 grams of polyvinylpyrrolidone was dissolved in the mixture. .1 milliliter vinylpyrrolidone was added. No catalyst was used. Polymerization took 12 hours at 60° C. The product polymer or resin rods were optically transparent, very strong, resilient, and easily machinable and were made into contact lenses and worn after hydration without any difficulty. The water content was 30%.

Obviously, many other modifications and variations of the modified and crosslinked polyvinylpyrrolidone polymers, or resins, and method of the invention are possible in the light of the teachings given hereinabove. It is, therefore, to be understood that, within the scope of the appended claims, the invention can be practiced otherwise than as specifically described.

Having described the invention, I claim:

1. A process of producing a substantially water-insoluble resin which comprises the steps of mixing together polyvinyl-pyrrolidone with, for each 100 parts of said polyvinylpyrrolidone, from about 0.1 to about 70 parts of monomeric vinylpyrrolidone; from about 135 to about 2,000 parts of a liquid methacrylic monomeric modifier selected from the group consisting of 2-hydroxyethyl methacrylate, 2-hydroxypropyl methacrylate, 2-dimethylaminoethyl methacrylate, 2-butylaminoethyl methacrylate methacrylamide, cyclohexyl methacrylate, tetrahydrofurfuryl methacrylate, ethylene glycol monomethacrylate, triethylene glycol monomethacrylate, tetraethylene glycol monomethacrylate, propylene glycol monomethacrylate, dimethylamino ethyl methacrylate, piperidinoethyl methacrylate, and morpholinoethyl methacrylate; from zero to about 25 parts of a crosslinking agent; and an amount of catalyst ranging from zero to about one gram thereof for each 100 milliliters of reaction mixture; thereafter heating the mixture thus formed to a temperature of at least about 50° C.; and maintaining said reaction mixture at such temperature until polymerization is substantially completed.

2. The process in accordance with claim 1, wherein said crosslinking agent is selected from the group consisting of ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol monomethacrylate, methacrylic acid, and methacrylyl glycolic acid.

3. A process in accordance with claim 2 wherein said catalyst is selected from the group consisting of benzoyl peroxide, lauryl peroxide, cumene hydroperoxide, dibutyl peroxide, azobisisobutyronitrile, tertiary butyl peroxide, tertiary butyl hydroperoxide, and ammonia plus hydrogen peroxide.

4. The process in accordance with claim 1 wherein said methacrylic monomeric modifier is a mixture of hydroxypropyl methacrylate and hydroxyethyl methacrylate; and no catalyst and no crosslinking agent are present.

5. The resin product obtainable in accordance with the process of claim 1.

6. The resin product obtainable in accordance with the process of claim 2.

7. The resin product obtainable in accordance with the process of claim 3.

8. The resin product obtainable in accordance with the process of claim 4.

References Cited

UNITED STATES PATENTS

| | | | |
|---|---|---|---|
| 3,462,385 | 8/1969 | Barabas et al. | 260—29.6 |
| 3,520,949 | 7/1970 | Shepherd et al. | 260—857 |

SAMUEL H. BLECH, Primary Examiner

J. SEIBERT, Assistant Examiner

U.S. Cl. X.R.

351—160; 260—875